United States Patent Office 3,383,053
Patented May 14, 1968

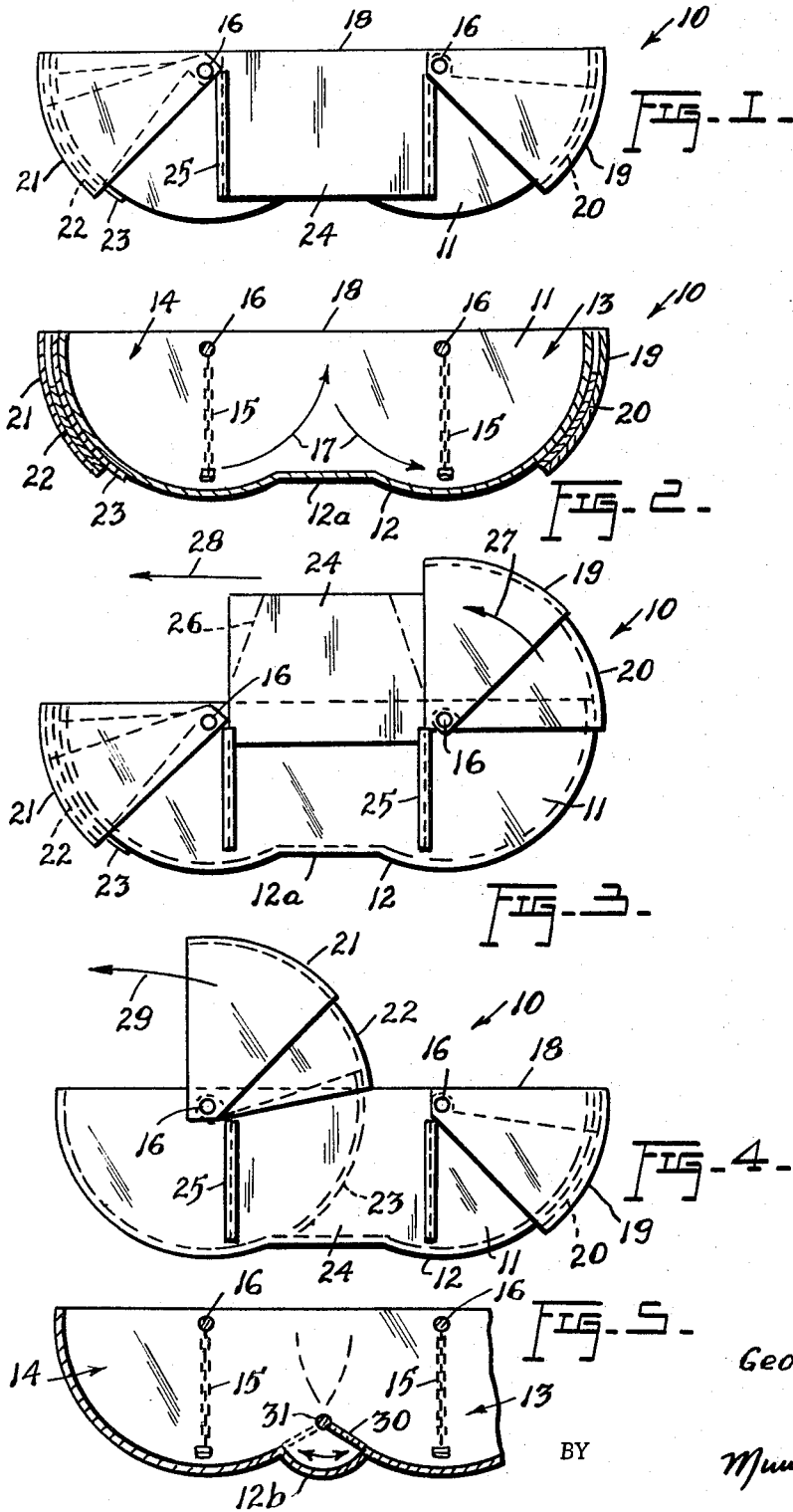

3,383,053
DUAL CHAMBERED ROTARY MILL, MIXER AND SPREADER CONTAINING RETRACTABLE HOODS
George C. Wood, c/o Darf Corporation, Edenton, N.C. 27932
Filed Feb. 17, 1966, Ser. No. 528,286
5 Claims. (Cl. 239—658)

This invention relates to new and useful improvements in combined mills, mixers and spreaders for material such as silage, manure, or the like, of the general type disclosed in my copending patent applications Ser. No. 350,884 filed Mar. 10, 1964, now Patent No. 3,301,566, Ser. No. 366,745 filed May 12, 1964, now Patent No. 3,294,406, Ser. No. 366,855 filed May 12, 1964, now Patent No. 3,272,515, and Ser. No. 369,470 filed May 22, 1964, now Patent No. 3,278,168.

The aforementioned patent applications disclose various arrangements of a combined material mill, mixer and spreader which includes a material receiving body or housing containing a rotary beater unit for milling, mixing and discharging or spreading the material contained in the body. As a practical matter, it is desirable that the material receiving capacity of the body be as large as possible, yet the effective working area of the rotary beater unit is limited by the radial span of its rotation. Thus, in some of the aforesaid applications, as for example, in Ser. No. 350,884, now Patent No. 3,301,566, and Ser. No. 369,470, now Patent No. 3,278,168, the rotary beater unit has been subjected to a translatory movement relative to the body or housing, so as to be capable of working upon material in a body of a greater capacity than would otherwise be possible if such translatory movement of the beater unit were not provided. Also, in another of the aforesaid applications, for example in Ser. No. 366,855, now Patent No. 3,272,515, the arrangement of the apparatus has been expanded or duplicated so as to provide two beater units operable successively in two separate bodies or housings, whereby the capacity of the apparatus has been virtually doubled. Yet, in all instances, the material receiving capacity of the housing or housings has been limited by the height or elevation of a conveyor used for loading the material into the housings, it being understood that the apparatus has to be moved into position under the discharge end of a conveyor in order for the housing or housings to be loaded with material.

In recognition of this functional limitation concerning elevation or height of loading, the aforesaid application Ser. No. 366,745, now Patent No. 3,294,406, provided a body or housing with a movable top portion such as could be shifted out of the way to permit the housing to pass under a conveyor of a given elevation or height for loading purposes. Thus, the housing could be loaded to full capacity and the shiftable top portion returned to its normal position, in readiness for commencement of the milling, mixing and spreading operation.

While the aforementioned arrangement of the housing in application Ser. No. 366,745, now Patent No. 3,294,406, deals with only a single housing or body, the principal object of the present invention is to provide a body or housing having twin, juxtaposed material receiving chambers or portions with a rotary beater unit in each, so that the material handling capacity of the apparatus is as large as possible. Moreover, the housing arrangement is such as to embody movable or shiftable top portions to permit loading of the housing to its full capacity without interference with the loading conveyor.

Other objects, features and advantages of the present invention will become apparent from the following description taken in conjunction with the accompanying drawings, wherein like characters of reference are used to designate like parts, and wherein:

FIGURE 1 is a side elevational view of the improved mill, mixer and spreader housing in its loading position;
FIGURE 2 is a longitudinal sectional view thereof;
FIGURE 3 is a side elevational view showing certain portions of the housing in their operative position;
FIGURE 4 is a side elevational view showing other portions of the housing in their operative position; and
FIGURE 5 is a fragmentary longitudinal sectional view showing a modified embodiment of the invention.

Referring now to the accompanying drawings in detail, more particularly to FIGS. 1–4, the general reference character 10 designates the housing or body of a combined material mill, mixer and spreader of the general type disclosed in my aforementioned patent applications. The apparatus is portable, being mounted on a truck, trailer, or the like, and is provided with a power drive for its beater units, but inasmuch as the mounting means and the power drive means are not involved in the present invention, they have been omitted in the drawings for sake of simplicity.

The housing or body 10 is horizontally elongated and includes a pair of transversely spaced side walls 11 together with a curved and angulated wall 12 which constitutes the bottom and the ends of the housing, as is best shown in FIG. 2. The configuration of the walls 11, 12 is such that the housing provides two juxtaposed housing portions or chambers 13, 14 which are substantially semicylindrical and communicate with each other, as will be apparent.

Operatively mounted in each of the housing chambers 13, 14 is a rotary beater unit 15 of a conventional type, carried by a suitably driven shaft 16 which is journalled in the side walls 11 of the housing. The two beater units 15 are intended to rotate in the same direction, as for example, in the direction of the arrows 17 in FIG. 2, but sequentially at different times, as will be hereinafter explained.

The housing walls 11, 12 terminate at their upper edges at a horizontal level 18 which is slightly above the shafts 16, but the housing is additionally provided with projectable and retractable extensions. These include two arcuate, overlapping hoods 19, 20 swingably mounted on the shaft 16 of the housing portion 13, three arcuate overlapping hoods 21, 22, 23 swingably mounted on the shaft 16 of the housing portion 14, and a pair of side plates 24 slidably positioned in vertical guides provided on intermediate portions of the housing side walls 11.

The hoods 19, 20 are complemental to the arcuate end of the housing portion 13 and in their retracted position as shown in FIGS. 1, 2 and 4, these hoods are disposed below the upper edge 18 of the housing so that the housing portion or chamber 13 may be loaded with material. Similarly, the hoods 21, 22, 23 are complemental to the arcuate end of the housing portion 14 and in their retracted position as shown in FIGS. 1, 2 and 3, these hoods are disposed below the edge 18 to facilitate loading of material into the chamber 14. During loading of the housing, the side plates 24 are also retracted below the edge 18 as shown in FIGS. 1 and 4, but as the loading operation continues, the plates 24 may be projected above the housing edges 18 as shown in FIG. 3, so that the central portion of the housing may be fully loaded as indicated by the dotted lines 26.

When the apparatus is to be operated, the hoods 19, 20 as well as the plates 24 are projected as in FIG. 3, while the hoods 21, 22, 23 are retracted. Drive is then applied to the beater unit 15 in the housing chamber 13, while the beater unit in the chamber 14 remains stationary. With the beater unit driven in the direction of the arrow 17, the material in the chamber 13 is milled, mixed and discharged as indicated at 27, 28, over and beyond the chamber 14, the hoods 19, 20 serving to deflect and guide the discharge of material in that direction.

When all the material in the chamber 13 has been discharged, the beater unit in that chamber is stopped and the hoods 19, 20 as well as the side plates 24 are retracted as shown in FIG. 4. The hoods 21, 22, 23 are then swung about the shaft 16 from the position shown in FIG. 3 to that shown in FIG. 4, wherein the hood 23 is disposed within the central portion of the housing to prevent material in the chamber 14 from falling into the now empty chamber 13 and the hoods 21, 22 are disposed above the housing edge 18 as shown, so that when drive is imparted to the beater unit in the chamber 14, the material in that chamber is milled, mixed and discharged as indicated at 29.

Since the beater units 15 operate in circular paths, some material may remain on the flat bottom portion 12a of the housing between the two chambers 13, 14 when both chambers have been emptied. To avoid this, a slightly modified arrangement may be provided as shown in FIG. 5, wherein the bottom portion 12b between the two chambers 13, 14 is in the form of a concave trough. A flapper plate 30, swingably supported by a cross shaft 31, may be oscillated in the concave trough 12b, so as to dislodge material therefrom into either the chamber 13 or the chamber 14, as the occasion may dictate.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In a material mill, mixer and spreader, a horizontally elongated housing forming a pair of laterally juxtaposed substantially semi-cylindrical chambers in communication with each other at the center of the housing, a rotary beater unit provided in each of said chambers, a set of projectable and retractable hoods provided on one of said chambers whereby material treated by the beater unit in that chamber may be guided and discharged longitudinally over and beyond the other chamber while the beater unit in the other chamber is inoperative, and a set of projectable and retractable hoods provided on the other chamber whereby material treated by the beater unit in said other chamber may be excluded from the first chamber and guidingly discharged from the other chamber in the same direction as from the first chamber.

2. The device as defined in claim 1 together with projectable and retractable side plates provided at the sides of the center portion of said housing between said sets of hoods of said chambers.

3. The device as defined in claim 1 wherein one of said set of hoods of said other chamber is movable to a position in the center portion of said housing whereby to separate said chambers from each other.

4. The device as defined in claim 1 wherein each of said beater units includes a drive shaft extending transversely of the associated housing chamber, the set of hoods of the associated chamber being swingably mounted on said drive shaft.

5. The device as defined in claim 1 together with a concave trough provided at the bottom of said housing between and in communication with said chambers, and an oscillatory flapper plate provided in said trough for dislodging material therefrom selectively into said chambers.

References Cited

UNITED STATES PATENTS 3,183,006    5/1965    Den Herder _____ 239—666

M. HENSON WOOD, JR., *Primary Examiner*.

H. NATTER, *Assistant Examiner*.